United States Patent [19]

Matai et al.

[11] Patent Number: 4,766,434

[45] Date of Patent: Aug. 23, 1988

[54] SELECTIVE PAGING RECEIVER WITH MESSAGE DISPLAY

[75] Inventors: Masahiro Matai; Toshihiro Mori, both of Tokyo, Japan

[73] Assignee: NEC Corporation, Japan

[21] Appl. No.: 906,148

[22] Filed: Sep. 11, 1986

[30] Foreign Application Priority Data

Sep. 17, 1985 [JP] Japan ................................ 60-204912

[51] Int. Cl.[4] .......................... H04Q 7/00; G05B 5/22

[52] U.S. Cl. ............................ 340/825.44; 340/311.1; 455/38

[58] Field of Search ...................... 340/825.44, 825.47, 340/825.48, 311.1, 286, 792, 799; 455/31, 38; 379/56, 57

[56] References Cited

U.S. PATENT DOCUMENTS

| | | | |
|---|---|---|---|
| 3,757,037 | 9/1973 | Bialek | 340/712 |
| 3,976,995 | 8/1976 | Sebestyen | 340/792 |
| 4,336,524 | 6/1982 | Levine | 340/825.44 |
| 4,382,256 | 5/1983 | Nagata | 340/825.44 |
| 4,385,295 | 5/1983 | Willard et al. | 340/825.44 |
| 4,504,825 | 3/1985 | Bergermann et al. | 340/709 |
| 4,618,860 | 10/1986 | Mori | 340/825.48 |

FOREIGN PATENT DOCUMENTS

| | | | |
|---|---|---|---|
| 0136677 | 4/1985 | European Pat. Off. | 340/825.44 |

*Primary Examiner*—John W. Caldwell, Sr.
*Assistant Examiner*—Edwin C. Holloway, III
*Attorney, Agent, or Firm*—Laff, Whitesel, Conte & Saret

[57] ABSTRACT

A pager has a receiver for receiving selective paging numbers and message data and a message display panel for displaying paging messages to the user. The pager has a first memory for storing message data. Control data, arriving together with the message data and related to its display, is stored in a second memory. A display controller, responsive to external operating inputs from the user, is provided for controlling the contents of the messages to be displayed on a basis of the control data. A display responds to control from the display controller, to read out and display messages stored in the first memory.

12 Claims, 13 Drawing Sheets

BLOCK DIAGRAM OF SELECTIVE PAGING RECEIVER WITH MESSAGE DISPLAY

RECEIVED PAGING SIGNAL

ADDRESS AND MESSAGE PORTION SIGNALS

BLOCK DIAGRAM OF SELECTIVE PAGING RECEIVER WITH MESSAGE DISPLAY

FLOW CHART OF DECODER OPERATION

FIG. 4(a) CLASSIFICATION AREA 1

| | |
|---|---|
| 00 | CONTROL AREA CONTINUES TO NEXT $M_n$ |
| 01 | PARTIAL DISPLAY |
| 10 | KEY WORD DISPLAY |
| 11 | ABBREVIATED DISPLAY |

FIG. 4(b) CONTROL AREA

FIG. 4(c) MESSAGE INFORMATION (SAMPLE MESSAGE)

1 10 20 25

MR.␣SATO␣CAME␣BACK FROM␣A 26 30 40 50

MERICA.␣PLEASE GO TO NARI 51 60 70 75

TA AIRPORT BY SEVEN

BLOCK DIAGRAM OF MESSAGE DATA PROCESSING CIRCUIT

BLOCK DIAGRAM OF MICROPROCESSOR

BLOCK DIAGRAM OF LCD DISPLAY DRIVER

BLOCK DIAGRAM OF RAM 300

FRAME SYNCHRONIZATION AND END SIGNAL DETECTOR

ADDRESS COMPARING CIRCUIT

BUFFER AMPLIFIER AND SPEAKER

FLOWCHART OF SUMMARY DISPLAY FUNCTION

DISPLAY MODE SELECTION ROUTINE

SELECTIVE PAGING RECEIVER WITH MESSAGE DISPLAY

This invention relates to a portable paging device for enabling a user to receive a paging message transmitted to him from another location, and more particularly to a selective paging receiver with a message display capable of reading out received message data and selecting the type of control used to show it to the user by means of the display.

BACKGROUND

Radio receivers for paging that include a message display panel conventionally scroll the message contents in a limited display area or display window to report the message to the person who has the receiver. That is, when the user presses a switch, all or a portion of the message information is shown to him in the limited message display area, character by character, and in an order beginning with the first character.

However, someone using a paging receiver with such a scrolling display will soon discover that it takes a considerable amount of scrolling to read a received message. For example, if the message display area can only show 16 characters at a time and if the received message is 350 characters long, the scrolling area will have to be used at least 2 times to deliver the full message. Obviously, such scrolling is even more inconvenient when the user wishes to read several individual messages received and stored by the paging receiver over a period of time.

For quickly scanning through multiple messages, some paging receivers have a "truncated display" function that permits just the first few characters of each message to be scrolled, rather than all of the characters of each message. Unfortunately, scanning through only such initial portions of the messages is often ineffective in helping the reader grasp their contents and importance.

OBJECTS OF THE INVENTION

Therefore, an object of the invention is to provide a selective paging receiver that enables the user to grasp the information in long messages without scrolling through their entire contents. A more particular object is to provide a paging receiver with a display having a "summary display function", by which is meant the ability to indicate the contents of received messages by a partial display, key word display, abbreviated display, or message type display. Yet a further object is to provide this summary display function within the limited area of the display used for messages, without increasing the number of character positions in the message display area.

BRIEF SUMMARY OF THE INVENTION

In keeping with one aspect of the invention, a pager has a receiver for receiving selective paging numbers and message data. A message display panel displays paging messages to the user. For storing message data, the pager has a first memory means. Control data, arriving together with the message data and related to its display, is stored in a second memory means. A display controller, responsive to external operating inputs from the user, is provided for controlling the contents of the messages to be displayed based on the control data. A display means responds to control from the display controller, to read out and display messages stored in the first memory means.

BRIEF DESCRIPTION OF THE DRAWINGS

The above mentioned and other features of this invention and the manner of obtaining them will become more apparent, and the invention itself will be best understood, by reference to the following description of an embodiment of the invention taken in conjunction with the accompanying drawings, in which:

FIG. 1(*b*) shows the digital make-up of address and message portion signals included in the paging signal of FIG. 1(*a*);

FIG. 4(*b*) shows the codes used in a Control Area of the message portion signals of FIG. 1(*b*);

FIG. 4(*c*) shows a sample message signal, received by the receiver of FIG. 2;

BRIEF DESCRIPTION OF OPERATION

The inventive selective paging receiver receives paging signals by means of its radio receiver section. If the paging number in the signal is the receiver's own identification number, it then receives and decodes control data and message data from the paging signal.

The message data is stored in a first memory means and the control data is stored in a second memory means. The received control data is for controlling a display, in a limited area of a display panel, which helps the user to grasp the received message information. In addition to full message displays, the received control data includes information enabling a brief summary display of each received message.

For example, the control data can be for controlling various helpful summary displays, such as a partial display, a key word display, an abbreviated display, or a message type display. A "partial display" comprises salient parts of a lengthy received message likely to convey its gist. A "key word display" attempts to report the principal information in a message by displaying a number of its key words. An "abbreviated display" employs prestored abbreviations of the words used in the partial and key word displays so a message of many words can be displayed in compressed form. A "message type display" shows to which classified topic the message information belongs; it enables the received message to be understood as "RE:____CASE". The person carrying the receiver uses selection buttons or the like to choose the summary display function. This enables the summary displays provided by the sender to appear in the display panel.

When the user has selected the summary display mode, the display controller, guided by the received control data stored in the second memory means, reads out selected message data stored in the first memory means and outputs it to the display means.

EXAMPLE OF AN EMBODIMENT OF THE INVENTION

As explained above, the invention gives the user the option of reviewing various helpful summary displays of paging messages stored in the receiver, such as a partial display, key word display, abbreviated display, or message type display. For convenience, the term "principal items" are used to refer generally to the words or abbreviations used in these summary displays.

Figure 1A:
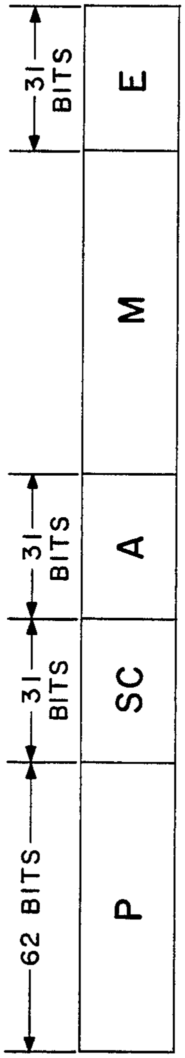
FIG. 1(*a*) shows the digital make-up of a typical paging signal received by a receiver according to the invention.
Figure 1B:
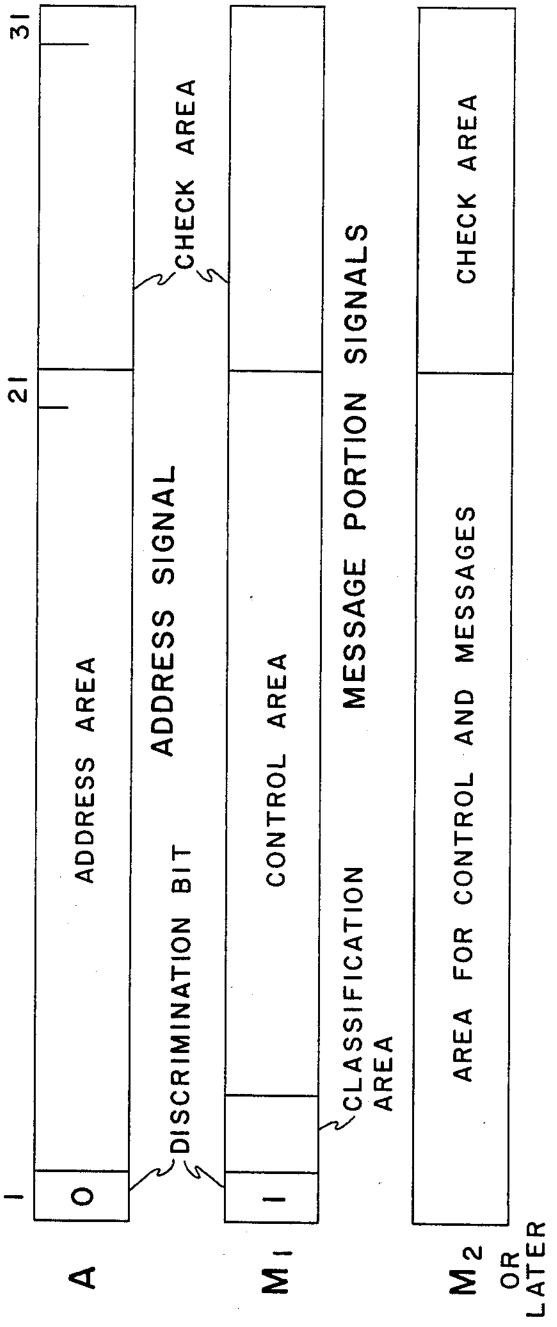

FIG. 1(*a*) shows the digital make-up of a typical paging signal received by a receiver according to the invention. These signals are constructed so that the principal items used in the summary displays can be extracted from the message information.

The paging signal is a format having a 62 bit preamble signal P, a 31 bit frame synchronizing signal SC, a 31 bit address signal A, a message signal M, and a 31 bit end signal E.

The frame synchronizing signal SC and the end signal E each have a predetermined fixed pattern. The message signal M has a length that depends on the amount of information in the message. As illustrated at FIG. 1(*b*), it is made up from as many 31 bit message portion signals $M_n$ (n=1, 2, . . . ) as are needed to convey the message.

The make-up of the address signal A and the message portion signals $M_n$ for Bose-Chandhuri-Hocquenghem BCH (31, 21) binary coded error correcting signals is shown at FIG. 1(*b*). Each signal is a 31 bit word comprising a 21 bit Information Area followed by a 10 bit Check Area.

During processing, the address signal A and the initial message portion signal $M_1$ are distinguished from each other by the leftmost or most significant bit (MSB), bit #1, in the Information Area. The MSB is a logical "0" in an address signal and a logical "1" in an initial message portion signal $M_1$.

In the initial message portion signal, the twenty bits of Information Area which follow the MSB have a very important use in this invention. This is the area which makes it possible to extract the "principal items" used in the various summary displays. It indicates the particular method of summary display for each message and the extraction points in the message.

Following the MSB is Classification Area 1, comprised of two bits, bits #2 & 3, which designate the form of summary display that will appear in the limited display area used for messages. Next is Control Area 1 which designates the extraction points.

Figure 2:
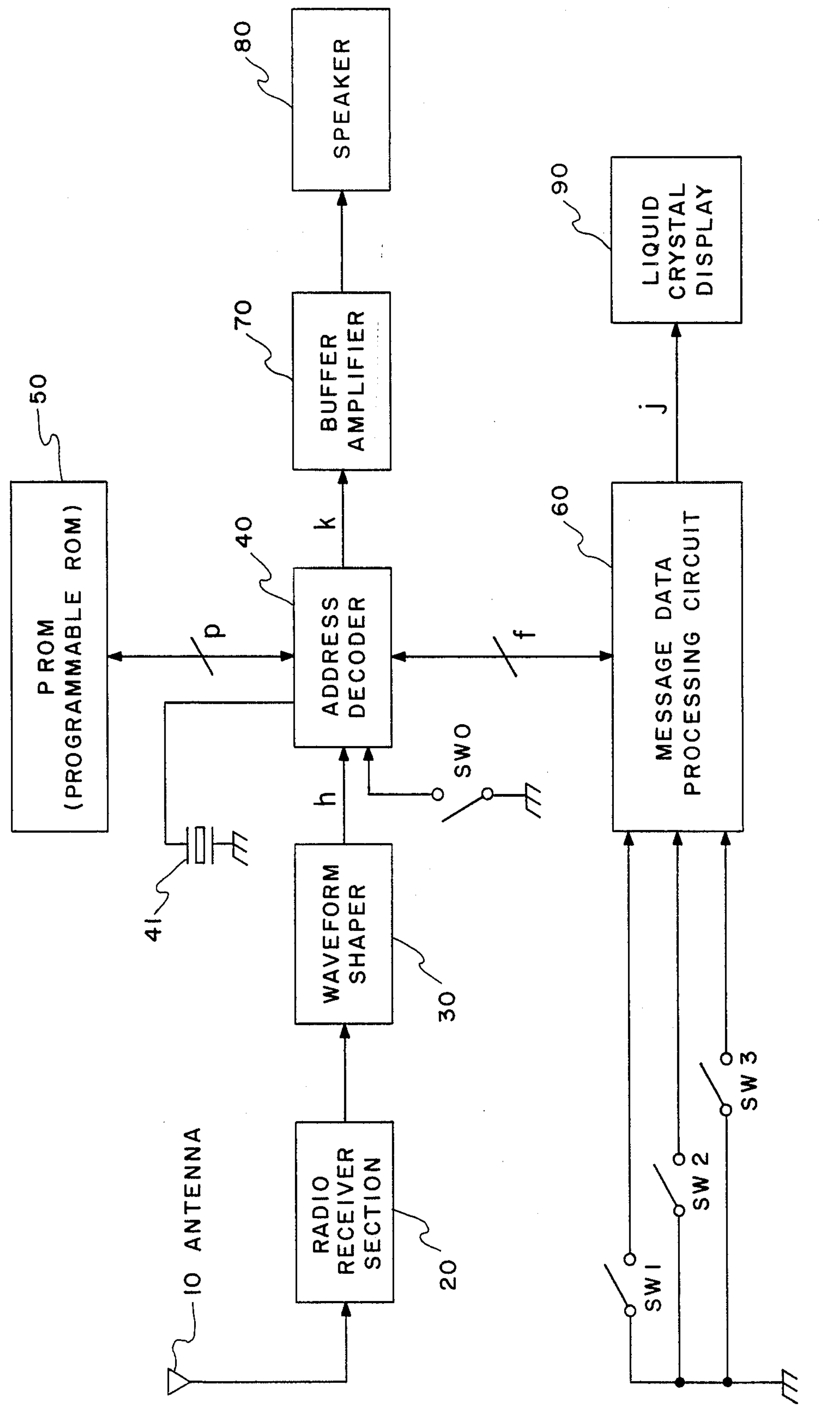
FIG. 2 is a simplified block diagram of an inventive selective paging receiver with message display for receiving the signals of FIG. 1.

FIG. 2 shows a simplified block diagram of an embodiment of the invention, a selective paging receiver with message display for receiving and using the paging signals of FIGS. 1(*a*) and (*b*). Electromagnetic signal waves picked up by an antenna 10 are fed to a radio receiver section 20, which recovers the baseband paging signal and sends it to a wave shape adjusting circuit 30. From there the paging signal is input to an address decoder 40 having a timing clock the accuracy of which is assured by crystal 41. Decoder 40 can read out data from a programmable read-only memory (PROM) 50 and exchange data with a message data processing circuit 60 via a multi-line signal f. Various information useful for running the receiver, such as its identification number, etc., have been written for storage into PROM 50, a memory device which can be programmed with information (written into) once, but not reprogrammed.

The output from decoder 40 is fed to a speaker 80 via an isolating buffer amplifier 70. Processed message data from circuit 60 is output to liquid crystal display (LCD) device 90 for displaying message information, etc. to the user. Operating switches SW0, SW1, SW2, SW3 enable the user to turn off an audible speaker alarm, to select operation and display modes, etc.

The detailed operation of this selective paging receiver with message display will now be described.

When the desired radio signal is picked up by antenna 10 and recovered by radio receiver section 20, its waveform is shaped by circuit 30 into a serial digital paging signal h, of the type shown at FIG. 1(*a*). Signal h is input to address decoder 40. Decoder 40 gets into bit synchronization using the preamble signal P, which has a repeating pattern of logical 1's and 0's, and proceeds to detection of the frame synchronizing signal SC which comes right after it.

Figure 3:
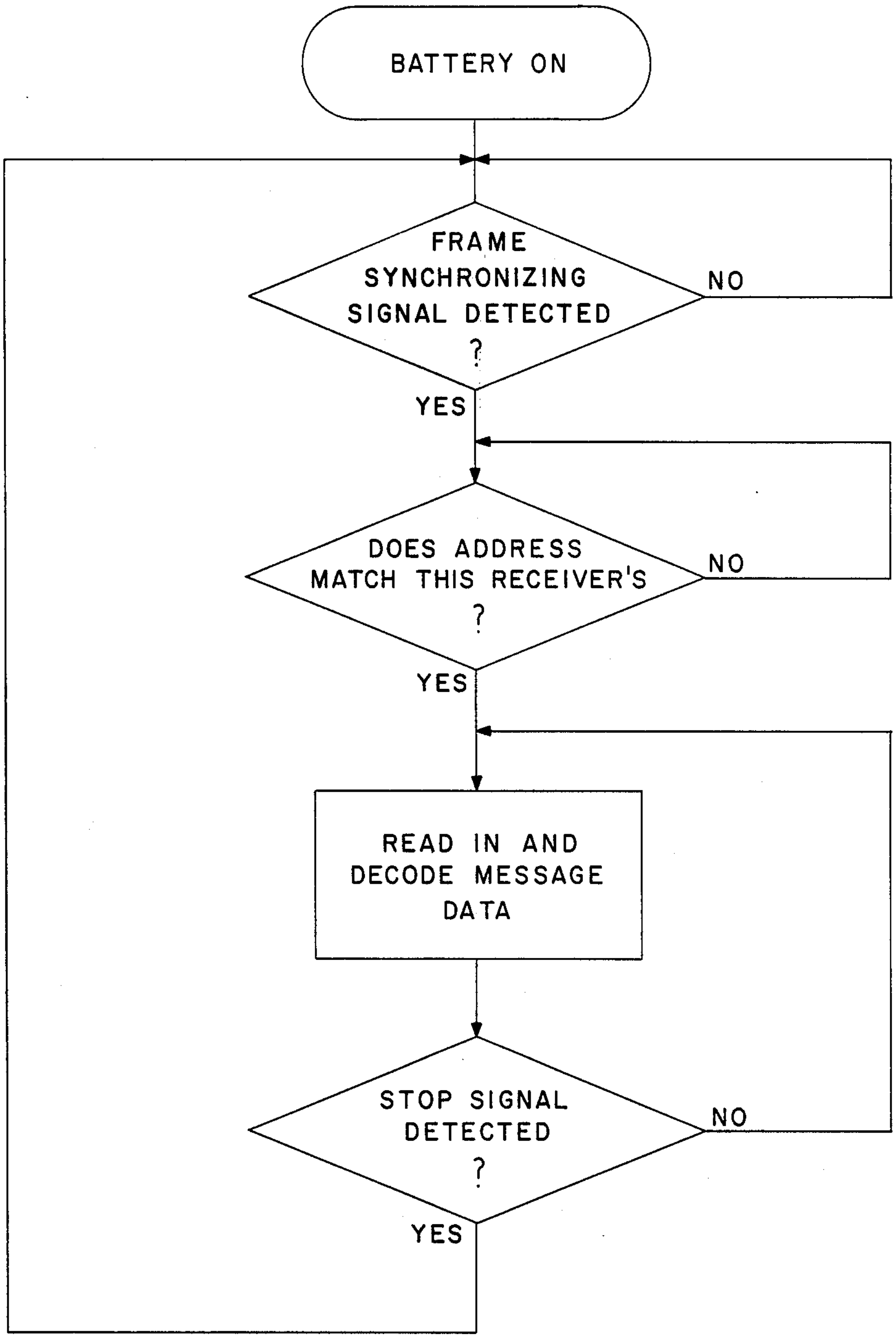
FIG. 3 is a flow chart showing the operation of the address decoder in the receiver of FIG. 2.

FIG. 3 is a flow chart showing the operation of the address decoder 40 in the receiver of FIG. 2. With power on, when detection of the frame synchronizing signal SC is confirmed, decoder 40 reads out its prestored selective paging address from PROM 50 and starts comparing it bit by bit with received address signal A, the next item in digital signal h. If the receiver's address matches the one in the paging signal, decoder 40 activates message data processing circuit 60 by means of signal f.

Immediately thereafter, message signal M is received and its 21 information bits are error corrected by using the 10 check bits. At the same time, decoder 40 begins watching for an end or stop signal E portion in digital signal h. When an end signal E is detected, the decoder 40 loops back to wait for detection of the next frame synchronizing signal SC.

Figure 4:
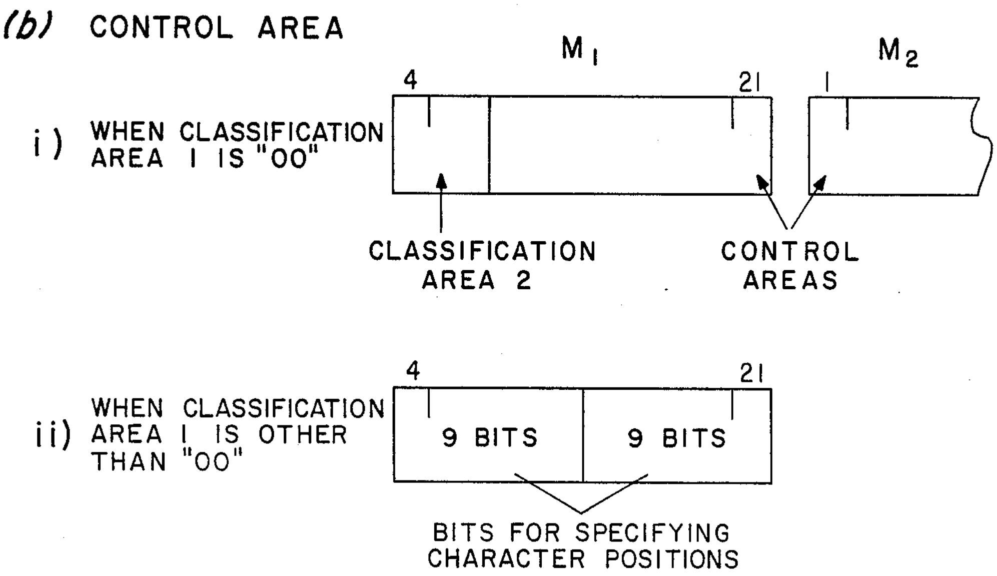
FIG. 4(*a*) shows the codes used in a Classification Area 1 of a first message portion signal of FIG. 1(*b*)

FIGS. 4(*a*) and (*b*) show an example of the make-up of the Classification Area 1 and Control Area appearing in the message signal of FIG. 1(*b*).

As stated earlier, Classification Area 1 comprises two bits which designate the form of display that will appear in the limited display area used for messages. The Control Area designates the positions of the first characters of words to be displayed. Nine bits are used to designate the position of each such character. Therefore, its relative position can be as far away as the 512th position.

Next, using the sample message shown at FIG. 4(*c*), examples will be given of the various methods of summary display.

Control_Area_Continues_to_Next_Signal

When the two bit Classification Area 1 of initial message portion signal $M_1$ is "00", it indicates that the next message portion signal $M_1$'s Information Area will also be a Control Area. Then, in initial message portion signal $M_1$ several of the bits which immediately follow Classification Area 1 are used as a further classification area, Classification Area 2, for enabling the method of display to be designated in more detail. This is explained more thoroughly below in connection with the expanded control area.

Partial_Display

When the two bit Classification Area 1 is "01", a partial display is designated. In the Control Area that follows, the next nine bits indicate the position of the first character of the first word used in the partial display, and the remaining nine bits indicate the position of the first character of the last word in the partial display. For example, the Control Area might designate the string of bits "000101001000101111".

For convenience, let us follow the convention of grouping these long bit strings by threes, viz: "000 101 001 000 101 111". The first nine bits (000 101 001) have the decimal value 41. From the sample message in FIG. 4(*c*), this means that the first letter of the first word of the partial display begins at character position 41, at the letter "G" of "GO". The remaining nine bits (000 101 111) have the decimal value 47. This means that the first letter of the last word of the partial display begins at position 47, at the letter "N" of "NARITA". Therefore, the sample message information is shrunk for the partial display to "GO TO NARITA".

Key_Word_Display

When the two bit Classification Area 1 is "10", a key word display is indicated. In the Control Area that follows, each group of nine bits indicates the position of the first character of a word to be extracted from the message for the key word display.

For example, suppose that the Control Area designates the bits "000 000 101 000 101 111". The first nine bits (000 000 101) have the decimal value 5. From the sample message in FIG. 4(*c*), this means that the first letter of the first key word begins at character position 5, that is, at the "S" of "SATO". The next nine bits (000 101 111) have the decimal value 47. This means that the first letter of the next key word begins at position 47, at the letter "N" of "NARITA". Therefore, the sample message information is reduced to the words "SATO NARITA" in the keyword display.

Abbreviated_Display

When the two bit Classification Area 1 is "11", an abbreviated display is indicated. In the Control Area that follows, each group of nine bits indicates the position of the first character of a word to be used in the abbreviated display, in a prestored abbreviation form if possible. The abbreviations that can be used in the display are prestored in PROM 50.

For example, suppose that the Control Area designates the bits "000 000 101 000 110 110". The first nine bits (000 000 101) have the decimal value 5. From the sample message in FIG. 4(*c*), this means that the first letter of the first word for the abbreviated display begins at character position 5, that is, at the "S" of "SATO". Therefore, a comparison is performed to see if an abbreviation for "SATO" is stored in PROM 50. If no prestored abbreviation exists, the word indicated is used as is. Let us assume that on checking PROM 50, it is found that "SATO" has no prestored abbreviation. If so, it is used in the abbreviated display as is.

The next nine bits (000 110 110) have the decimal value 54. This means that the first letter of the next word for the abbreviated display begins at position 54, at the letter "A" of "AIRPORT". Let us assume that on checking PROM 50, it is found that "AIRPORT" has a prestored abbreviation of "A. P.". If so, in the abbreviated display "A. P." is used in place of the word "AIRPORT".

Therefore, the sample message information is reduced to the expression "SATO A. P." in the abbreviated display.

Expanded_Control_Area

As illustrated above, the two bits of Classification Area 1 are used to designate the type of summary display. When Classification Area 1 is "10" (Key Word Display) or "11" (Abbreviated Display), as shown at FIG. 4(*b*) (*ii*) only two nine bit "position-indicating" numbers can be stored in the control area. Therefore, the Key Word or Abbreviated display is limited to just two words or abbreviations, and not all the display area is used effectively.

If Classification Area 1 is instead designated as "00", as shown at FIG. 4(*b*) (*i*), the Control Area is expanded by continuing it into the 21 bit Information Area of message portion signal $M_2$. Then, in the initial message portion signal $M_1$ a further classification area (Classification Area 2) is provided directly behind Classification Area 1, to enable a more detailed Key Word or Abbreviated display.

For example, if Classification Area 2 is two bits long (bits #4 & 5), we can use the same classification codes for it that were used in Classification Area 1:

01=Partial Display
10=Key Word Display
11=Abbreviated Display

For a Key Word display, the two bits of Classification Area 2 are "10", and for an Abbreviated display the two bits are "11". Since Classification Area 2 is assumed to take only two bits, as shown at FIG. 4(*b*) (*i*) there is still room in initial message portion signal $M_1$ for a 16 bit Control Area at bits #6-21. In addition, because Classification Area 1 is "00", the Control Area continues to the next message portion signal $M_2$, where there is room for another 21 control bits (bits #1-21).

Therefore, there is a total of 37 (16+21) control bits to designate a plurality of (9 bit) position-indicating numbers for the Key Word or Abbreviated display. At a 9 bits per position designation, a total of four ($4\times9=36<37$) Key Words or Abbreviations can be designated. As before, each word is designated by giving the relative position in the message of its first character.

In the embodiment disclosed above, as shown at FIG. 4(*a*), Classification Area 1 designates a two bit code indicating the type of summary display. However, with suitable modifications Classification Area 1 can instead designate a code, extracted from the key words of long sentences, for making certain preselected sentences.

For example, consider paging those doing business in a market where there is frequent dealing in stock prices, etc. Key words can be extracted from the stock names and forecasts in a series of paging message information that reports stock names, prices, and forecasts of future fluctuations. Then Classification Area 1 can designate a code which indicates how to use the key words to form such summary displays such as "NEC—BUY", "AB-C—SELL". When the user wants to learn more about these matters, he can also scroll the message information in its entirety to learn the specific details of stock prices, etc.

The mechanism by which words are designated for the display will now be explained, including the message data processing circuit 60 and liquid crystal display (LCD) 90.

Figure 5:
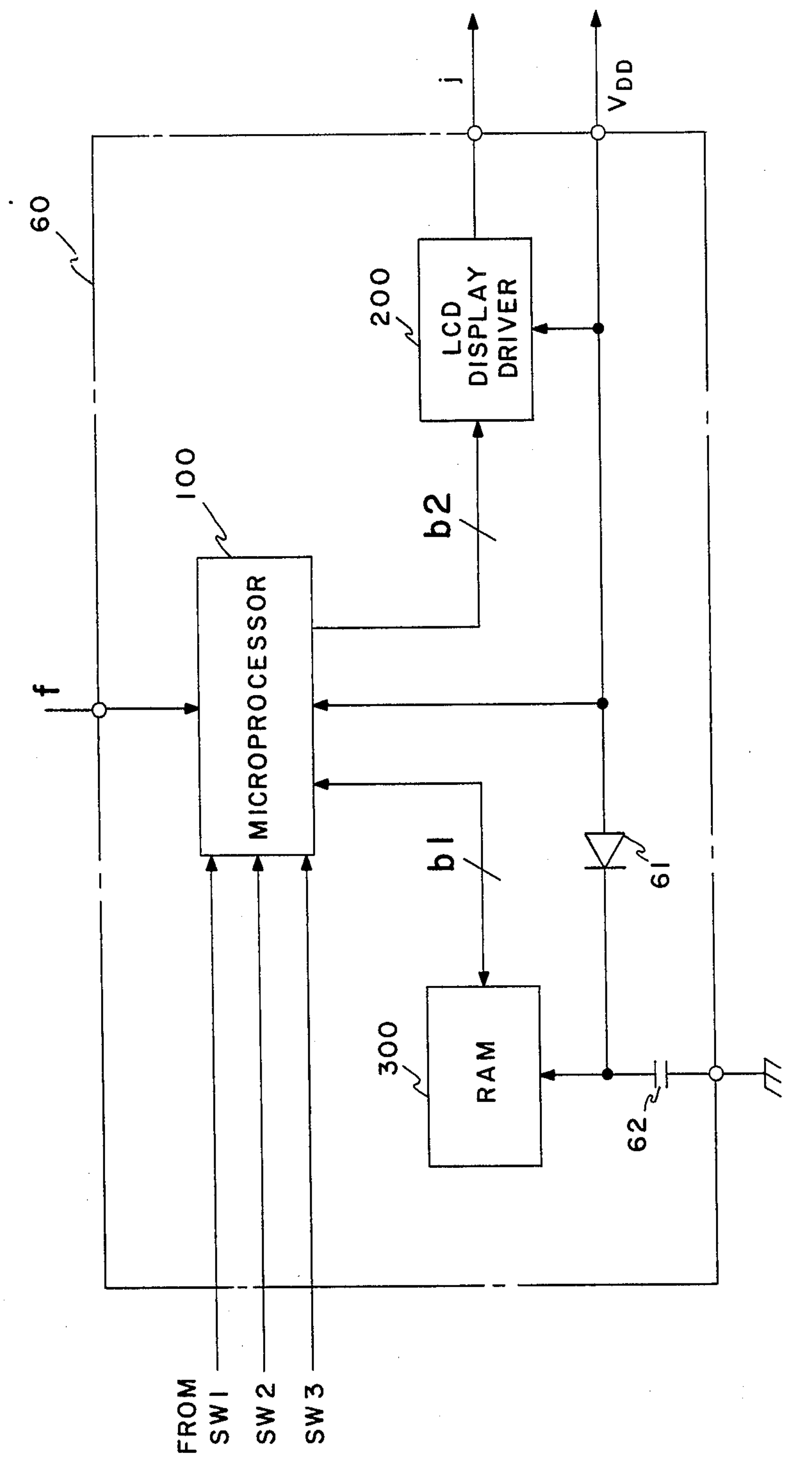
FIG. 5 is a block diagram of the message data processing circuit in the receiver of FIG. 2.

FIG. 5 is a block diagram of the message data processing circuit 60 in the receiver of FIG. 2.

As shown in FIG. 5, processing circuit 60 receives the user's operating instructions by reading input lines from user operating switches SW1, SW2, SW3 (FIG. 2), receives input from address decoder 40 on line f, and outputs display driving signals to the liquid crystal display (LCD) 90 (FIG. 2) on line j. Processing circuit 60 has a one chip CPU or microprocessor 100 that reads and writes data to a random access memory (RAM) 300 on line b1. An LCD driver 200 receives input about the display contents from microprocessor 100 on line b2 and outputs display driving signals on line j.

In FIG. 5, $V_{DD}$ indicates a power supply voltage applied from a battery 1000 (FIG. 11) through a DC-DC converter (not shown). A power supply back-up capacitor 62 is provided for RAM 300. A diode 61 is inserted in the line from the power supply so that if voltage $V_{DD}$ drops below the voltage of capacitor 62, the diode will open, isolating the back-up capacitor from the power supply.

RAM 300 acts as a first memory means for storing received message information, etc. The LCD driver 200 and LCD display 90 together form a display means for displaying the message information to the user. Microprocessor 100 acts as a display controhler means for controlling the display means.

Figure 14:
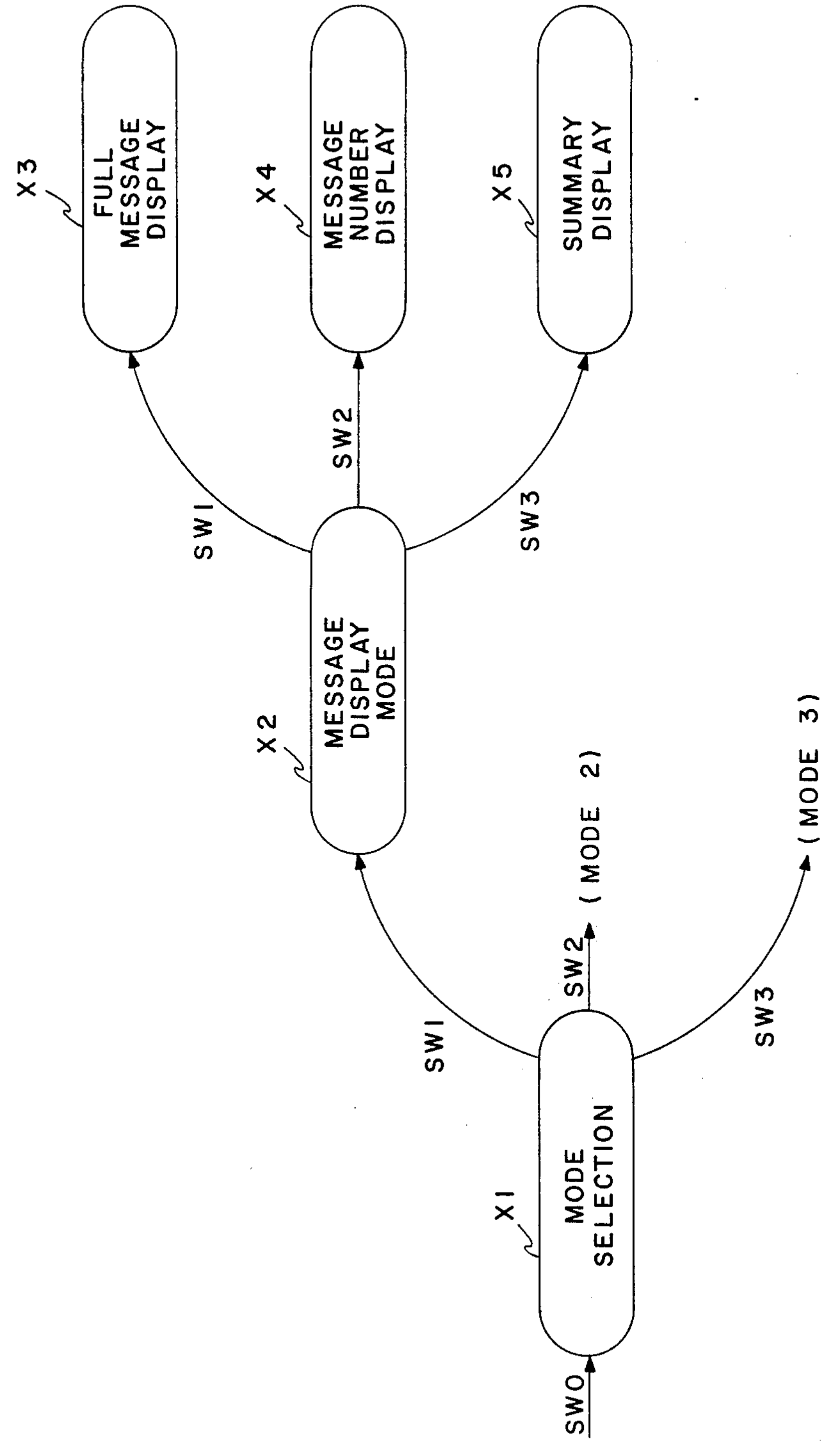
FIG. 14 is an illustration of a routine by which the pager's types of displays can be selected using operating switches.

It is convenient if the operating switches SW0, SW1, SW2, and SW3 are normally open push button switches that spring back to the open condition when released. Then the user can press (close) them one or more times in various sequences to give commands to the microprocessor (FIG. 14).

When the user closes operating switch SW0 (FIG. 2), it results in a trigger signal being input from decoder 40 on line f to microprocessor 100. The microprocessor responds by entering a Mode Selection state X1 shown in FIG. 14. In state X1, switch SW1 enables selection of a Message Display Mode X2, while SW2 and SW3 respectively enable selection of Modes 2 and 3, other possible modes of the receiver not discussed here.

Assuming SW1 is pressed while in the Mode Selection state X1, the microprocessor responds by entering the Message Display Mode or state X2. The user can then choose from among a Full Message Display (X3) by SW1, a Message Number Display (X4) by SW2, and a Summary Display (X5) by SW3. (The Message Number Display shows the number of each message so the user will know how many have been received, etc.)

If desired, the default display mode (when none of switches SW1, SW2, or SW3 is pressed after a short wait) can be a "truncated display", causing LCD display 90 to display only a preselected number of beginning characters from each of the various messages stored in RAM 300.

If the user selects the Summary Display by closing operating switch SW3, microprocessor 100 causes LCD display 90, to display certain corresponding "principal items" from the messages stored in RAM 300 as a summary display in accordance with control data stored in a second memory means. The second memory means is discussed in more detail below.

Furthermore, there is an easy way for the user to read out all of a message having a summary display which has caught his attention. While the summary display of that message is still being shown by LCD display 90, the user can again close switch SW0. This causes a trigger signal to be input to microprocessor 100 from decoder 40 on line f. Microprocessor 100 then returns to the Mode Selection state X1 of FIG. 14. If the user next presses switch SW1 twice in succession, microprocessor 100 moves to the Message Display Mode X2 and then continues on into the Full Message Display mode X3. It reads out from RAM 300 the entire stored message information for the message, displaying it via display 90.

Figure 6:
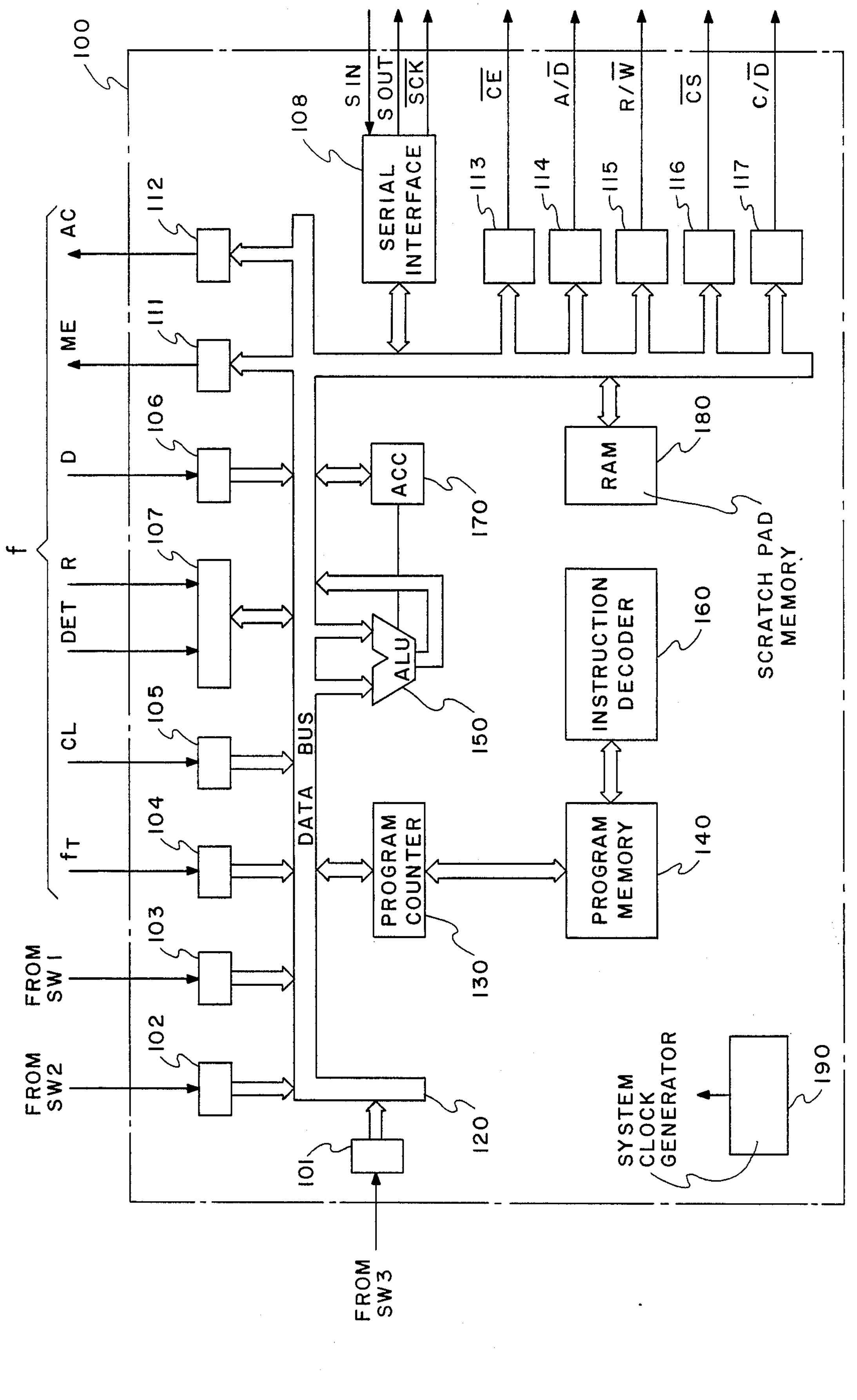
FIG. 6 is a block diagram of the one chip CPU or microprocessor in the processing circuit of FIG. 5.
Figure 7:
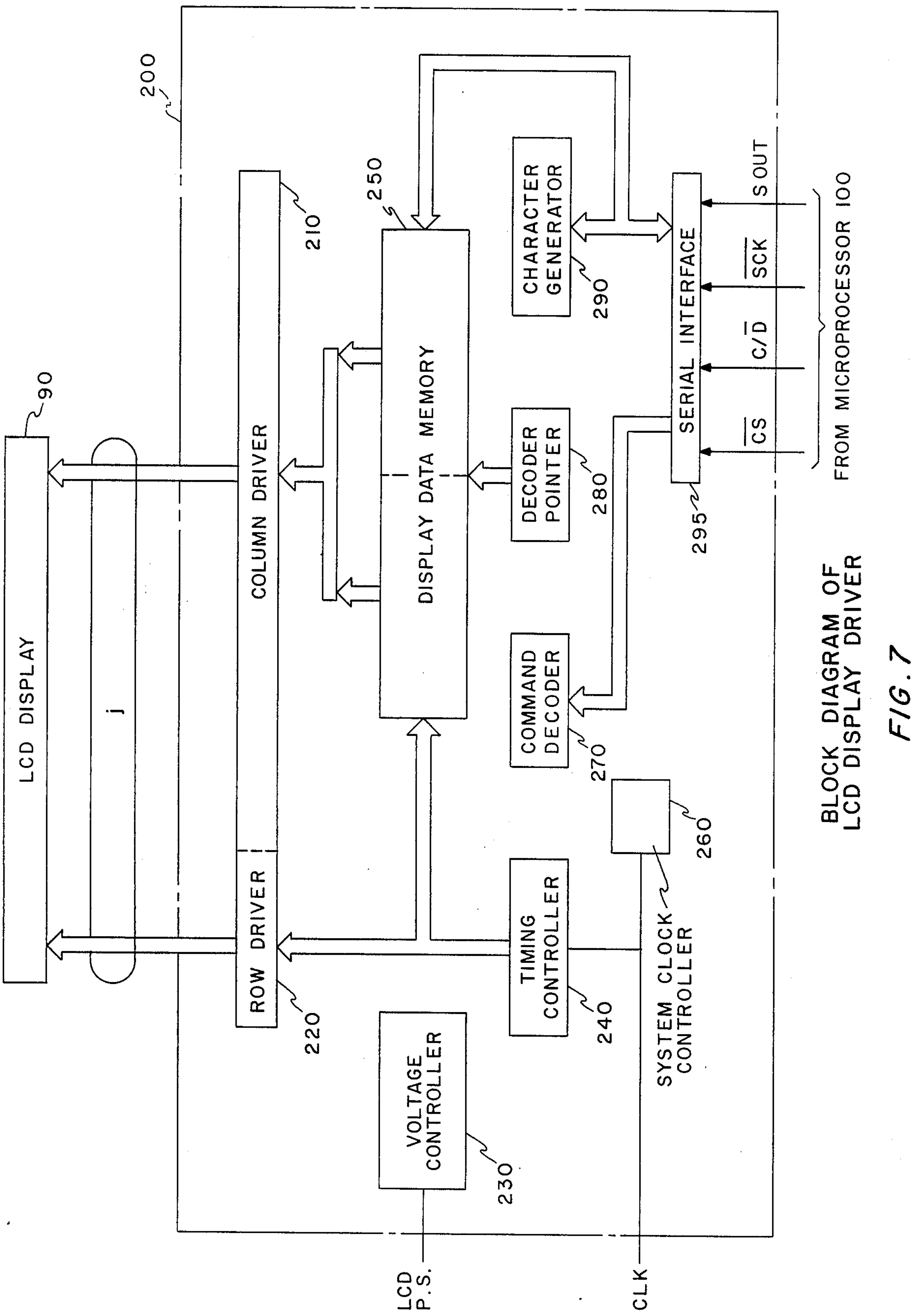
FIG. 7 is a block diagram of the LCD driver circuit in the processing circuit of FIG. 5, and its associated LCD display.
Figure 8:
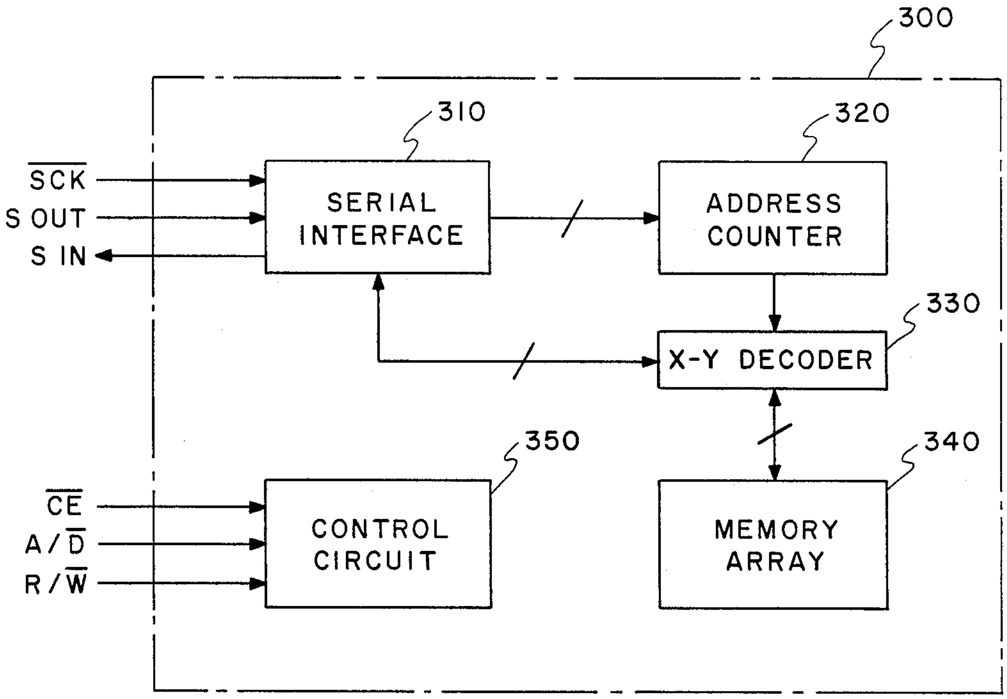
FIG. 8 is a block diagram of the random access memory (RAM) in the processing circuit of FIG. 5.

The details of microprocessor 100, LCD driver 200, and RAM 300 are respectively shown in FIGS. 6, 7 and 8.

Microprocessor

As shown in the block diagram of FIG. 6, for input-/output, microprocessor 100 has input ports 101–106, a port 107 for interrupts, and a serial interface 108. It also has output ports 111–117 and a data bus 120.

A program memory 140 stores the sequence of program instructions that must be executed. A program counter 130 specifies the address of the next instruction to be read out of memory 140 and executed. An instruction decoder 160 decodes the program instruction information read out from program memory 140. It then provides control signals in accordance with the instructions to the various circuits for execution of the instructions. An arithmetic/logic unit (ALU) 150 performs arithmetic and logical operations called for by the program instructions.

An accumulator (ACC) 170 is used in sending data to, and receiving it from, RAM 180 and the various ports 101–117. An internal RAM 180 is a scratch pad memory for storing various types of data and providing temporary storage for program status information and program counts when executing subroutines and interrupts. A system clock generator circuit 190 generates a series of timing pulses that determine the instruction execution cycle times.

Display_Driver

FIG. 7 shows a block diagram of the LCD driver 200 in the processing circuit of FIG. 5, and its associated LCD display 90. The LCD driver 200 has a column driver 210 for controlling the columns shown by display 90, and a row driver 220 for controlling the rows. A display voltage controller 230 controls the voltage supplied to the LCD display, and a timing controller 240 controls timing of the driving signals to the LCD display.

Figure 11:
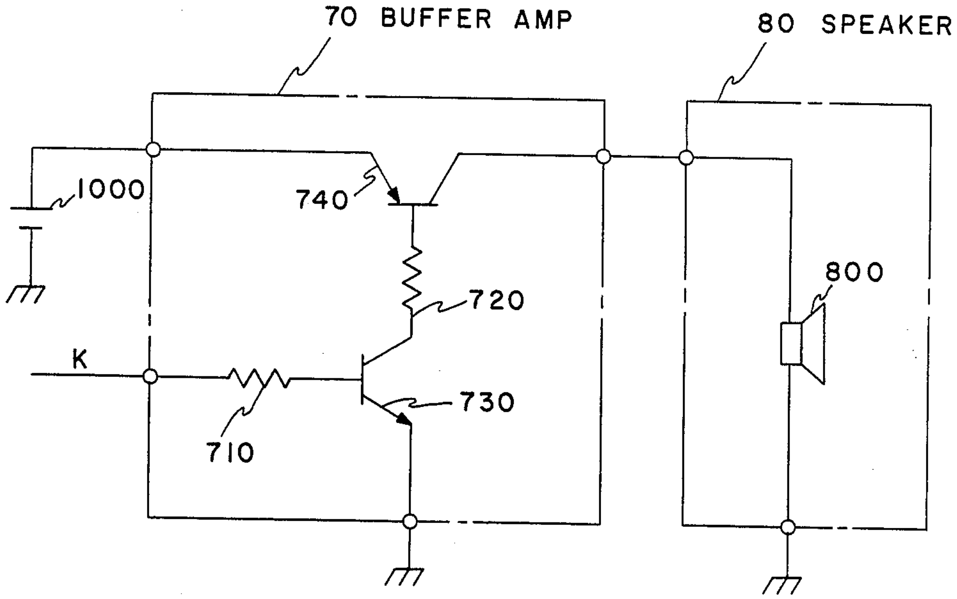
FIG. 11 is a simplified schematic of the buffer amplifier and paging speaker circuits in the receiver of FIG. 2.

In FIG. 7, input line LCD P.S. indicates a power supply line from a battery 1000 (FIG. 11). A clock input line CLK supplies a system clock from system clock generator 190 on the microprocessor chip 100 (FIG. 6).

Display driver 200 includes a data memory 250 which can store output from a character generator circuit 290 or store display data input via a serial interface 295. Circuit 260 is a system clock controller. A command decoder 270 takes in and decodes the display instructions input from microprocessor 100 via serial interface 295. It then provides control signals in accordance with the instruction contents to the various circuits for execution of the instructions.

When data from serial interface 295 is stored, a data pointer 280 holds the address in data memory 250 at which it is to be written. When data is read out from data memory 250 into serial interface 295, data pointer 280 holds the address from which it is to be read. The character generating circuit 290 generates a 7×5 dot matrix character pattern in accordance with data input to it. The serial interface 295 enables display driver 200 to receive data in serial form from, and send it to, microprocessor 100.

RAM_Memory_300

FIG. 8 shows a block diagram of the random access memory (RAM) 300 in the processing circuit of FIG. 5. A serial interface 310 enables RAM 300 to receive data in serial form from, and send it to, microprocessor 100. An address counter 320 receives input pulses via serial interface 310.

RAM chip 300 includes a memory array 340 having storage locations which are organized in rows and columns. An X-Y decoder 330 analyzes the data in the address counter 320 to designate a corresponding memory array address in memory array 340. Display data is written into, or read out of, the memory array addresses designated by X-Y decoder 330. A control circuit 350 receives control signals from microprocessor 100, such as those controlling the reading and writing of display data.

Detector_and_Alarm_Circuits

Figure 9:
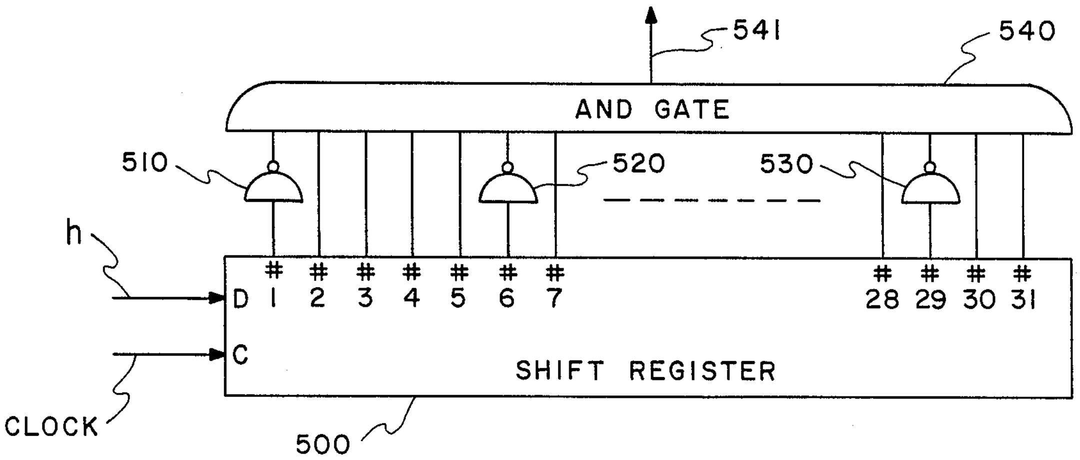
FIG. 9 is a block diagram of a detector circuit, for detecting certain frame and stop signals, used by the address decoder in the receiver of FIG. 2.

FIG. 9 is a block diagram of a detector circuit, for detecting frame synchronization and stop signals, used by address decoder 40 in the receiver of FIG. 2. A 31 bit shift register 500 is provided that receives the 31 bit words of the digital paging signal h as input from wave shape adjusting circuit 30 of FIG. 2. A clock pulse is received for timing the shifting of the data in the register. Logical outputs (1's and 0's) from the bits stored in the register are input to a multi-input AND gate 540, preselected input lines to AND gate 540 having inverter circuits 510, 520 and 530, as shown at register bits #1, 6, and 29.

Figure 10:
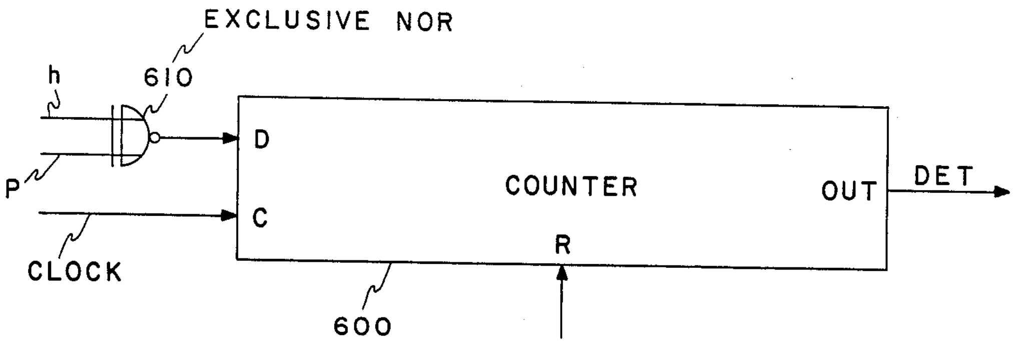
FIG. 10 is a simplified schematic of a detecting circuit, for detecting selective paging signals, used by the address decoder in the receiver of FIG. 2.

FIG. 10 shows a simplified schematic of a detecting circuit, for detecting selective paging signals, used by the address decoder 40 in the receiver of FIG. 2. A counter 600 receives as input a clock signal and the output of an Exclusive NOR gate 610. The inputs to Exclusive NOR gate 610 are the digital paging signal h from wave shape adjusting circuit 30 and a signal p from programmable ROM 50. The output of Exclusive NOR gate 610 will only be a logical "1" for those bits where its two inputs agree, i.e. bits of signal h that agree with the bits of signal p, prestored in PROM 50.

FIG. 11 shows a simplified schematic of an audio alarm, comprising the buffer amplifier 70 and paging speaker 80 circuits in the receiver of FIG. 2. In buffer amplifier 70, the base of an NPN transistor 730 receives, via an input resistor 710, an input alarm signal k from the output of address decoder 40 of FIG. 2. The emitter of transistor 730 is grounded, and its collector is coupled via a resistor 720 to the base of a driving PNP transistor 740, the emitter of which is connected to battery 1000. The collector output of transistor 740 drives a horn or speaker alarm 800 in speaker circuit 80

DETAILED OPERATION

Signal waves picked up by antenna 10 are demodulated by radio receiver section 20, and the recovered signal is shaped by wave shape adjusting circuit 30 into a serial digital paging signal h, of the type shown at FIG. 1(*a*). This is supplied to address decoder 40. Address decoder 40 gets into bit synchronization with signal h using the preamble signal portion P shown in FIG. 1(*a*).

Next, decoder 40 proceeds to a detection of the 31 bit frame synchronizing signal SC which follows the preamble signal P. FIG. 9 shows a detector circuit used in decoder 40 to detect the frame synchronizing signal SC. Serial digital signal h is input into the low end of a 31 bit shift register 500 and shifted toward the right into the register, responsive to clock pulses. Register outputs #1–31, corresponding to the bits stored in register 500, are input into a multi-input AND gate 540. Certain of the register outputs are inverted before being input to gate 540, as indicated by inverter circuits 510, 520 and 530 for bits #1, 6, & 29. The AND gate 540 and its inputs are arranged so that when the preselected 31 bit pattern of the frame synchronizing signal SC is input to register 500, all of the inputs to AND gate 540 are logical 1's, causing it to output a 1 at gate output 541.

Detection of synchronizing signal SC causes decoder 40 to read the next 31 bits of signal h as the address signal portion A. Received address signal A is compared with the receiver's prestored paging address signal by the detection circuit of FIG. 10. The receiver's prestored digital paging address is read out from PROM 50 as signal p. Signal p is compared, bit by bit, with the address signal A portion of signal h by an Exclusive NOR gate 610.

Exclusive NOR gate 610 only produces a logical 1 as an output to a counter 600 when the corresponding bits in input signals p and h match. Hence, if the received address portion A of signal h matches the receiver's prestored paging address, each of the 31 bit positions will match, and counter 600 will count up to 31. In practice, counter 600 is arranged to output a DET (Address Detected) signal if its count reaches 29 or more. That is, only 29 of the 31 bits of address A need to match the prestored paging address for the receiver to recognize that it is being paged.

A reset signal is provided on the counter 600 at a reset terminal R, to clear the counter to all 0's after the 31 bits of address A have been compared with the bits of signal h. If a DET signal is output because of a count of 29 bits or more, the DET output signal will precede the clearing of the counter by the reset signal.

Meanwhile, the detector circuit of FIG. 9 which was used to detect the frame synchronization signal has begun searching for the end or stop signal portion E, in signal h shown at FIG. 1(*a*).

However, the portion of signal h following detection of the receiver's paging address is usually one or more 31 bit message portion signals $M_n$ (n=1, 2, . . . ).

Therefore, from the microprocessor-based message data processing circuit of FIG. 6, when the DET (Address Detected) signal is generated by counter 600 in address decoder 40, it is fed as an interrupt signal to microprocessor 100 via interrupt port 107. The interrupt activates microprocessor 100. At the same time, decoder 40 supplies a clock signal CL indicating a transmission speed to input port 105 of the microprocessor.

Using clock signal CL, microprocessor 100 reads in a 31 bit message signal D at its input port 106 from decoder 40. The bits in message signal D are the 31 bits in the received message portion signal $M_n$ currently being processed.

By means of its instruction decoder 160, microprocessor 100 translates instructions prestored in program memory 140 and processes signal D by executing them. That is, after being read in via data bus 120 and accumulator ACC 170, message signal D is written in scratchpad memory RAM 180. Unit microprocessor 100 then uses its Arithmetic Logic Unit ALU 150 to carry out the necessary computations on each of the received 31 bits of message signal D stored in scratchpad memory 180 to recover 21 error-corrected information bits from message signal D.

Figure 12:
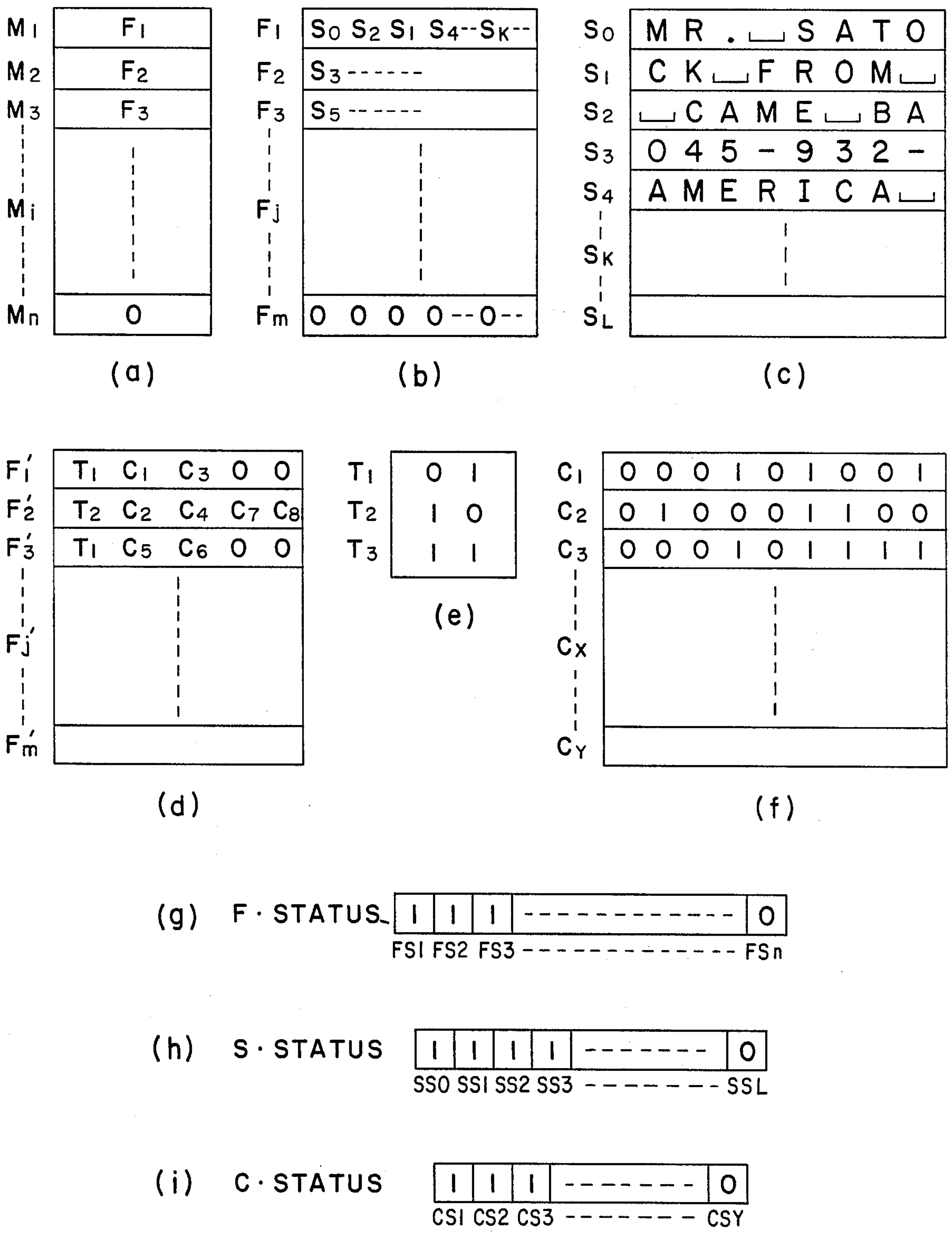
FIG. 12 is an explanatory chart of the various memory storage areas (a)–(i) provided for message and control information.

Next, to be explained is how the various decoded BCH (31, 21) message portion signals $M_n$ are handled in memory after error correction. FIG. 12 shows an explanatory chart of the storage areas provided for storing messages and display control information. At (a) in FIG. 12 is a message table having addresses Mi (i=1, 2, . . . n) storing the message file numbers $F_j$ of new and old received message information. Initially the data at addresses M1–Mn is all zeros, meaning that no messages are stored.

FIG. 12 shows examples of a file area (b) and a sector area (c) in the memory which are together used to store message information. File names $F_1$–$F_m$ are assigned to correspond to a message file's position number in the file area of memory. The message information is stored in memory in regularly numbered memory sectors $S_k$. Each memory sector is of fixed length (e.g. 8 characters) and usually only holds a portion of a message. The sector names $S_0$–$S_k$ are assigned to correspond to the sector's position number in the sector area of memory.

In each message file $F_j$, the names of the sectors $S_k$ which compose the message information are stored in the order needed to make up the message. For example, at (a) in FIG. 12 we learn that Message M1 is stored in file $F_1$. At file area (b) in the same figure we learn that the message is stored in sectors $S_0$, $S_2$, $S_1$, $S_4$, . . . $S_k$ in that order. Using sector area (c), we can then read the message in file $F_1$ as "MR. SATO CAME BACK FROM AMERICA . . . "

The display control information is stored in memory areas indicated by (d), (e) and (f) in FIG. 12. Area (d) is a control file area. In it are stored control files $F'_1$–$F'_m$. Each control file $F'_j$ designates a summary display by means of a control code address $T_c$ followed by several character address numbers $C_x$.

The control code address $T_c$ in a control file $F'_j$ designates the address of a storage location in a control code area (e). The designated location holds the two bit display classification code from Classification Areas 1 and 2 of the message portion signals. (See FIGS. 4(*a*) and 4(*b*).) The two bit classification codes stored in control area (e) designate the various methods for summary displays of the received message information, such as Partial Display (01), Key Word Display (10) or Abbreviated Display (11).

Each character address number $C_x$ in a control file $F'_j$ designates the address of a storage location in a character address area (f). The designated location holds the 9 bit relative position number of the first character of a word used in the summary display.

The control files $F'_j$ have a one to one correspondence with the message files $F_j$ with the same index number j. They are arranged so the control instructions for a summary display of the message information in message file $F_j$ are in a corresponding control file number $F'_j$. Moreover, the memory is controlled so that when the message information in a message file $F_j$ is deleted, the contents of the corresponding control file $F'_j$ are also deleted.

In the control files of the present example, the two bit display control codes are replaced by control code addresses $T_c$.

However, the two bit display control codes themselves could instead be used at the beginning of the control files $F'_j$ instead of the control code addresses $T_c$.

To illustrate how this coding in memory of the summary displays works, recall the previous sample message file $F_1$ which contains sector names that point to the message of shown at FIG. 4(*c*), "MR. SATO CAME BACK FROM AMERICA. PLEASE GO TO NARITA AIRPORT BY SEVEN". The corresponding control file $F'_1$ designates a summary display by the string "$T_1$ $C_1$ $C_3$ 0 0 ".

Looking at address $T_1$ in control code area (e), we find the display code "01", which stands for a Partial Display. A Partial Display is a continuous string of words taken from the actual message; it is designated by indicating the first and last words in the string.

Looking at character address $C_1$ in character address area (f), we find the stored binary number "000 101 001", which is decimal 41. This means that the first letter of the first word of the partial display begins at character position 41, at the letter "G" of "GO".

Looking at character address $C_3$ in character address area (f), we find the stored binary number "000 101 111", which is decimal 47. This means that the first letter of the last word of the partial display begins at position 47, at the letter "N" of "NARITA". Therefore, the Partial Display will read "GO TO NARITA". Since no further character addresses are needed for the Partial Display, the last two items in the control file $F'_1$ are filled with zeros.

This same example appeared earlier relative to coding of the Classification Area and Control Area of received message portion signals. Now we are seeing the same Partial Display after it is stored in memory for use.

Memory areas (g), (h) and (i) of FIG. 12 are set aside as status registers. An F-STATUS register shown at (g) has m bits FSj (j=1, 2, . . . m) that indicate the current use status of the memory's message file area (b). Each bit FSj stores an indication as to whether the area of the corresponding message file $F_j$ is being used. Bit FSj is "0" when the area of the corresponding file $F_j$ is not in use, and "1" when the area is in use.

Similarly, an S-STATUS register shown at (h) has L bits SSk (k=0, 1, 2, . . . L) indicating the current use status of the memory's sector area (c). Bit SSk indicates whether the corresponding sector $S_k$ is being used. A C-STATUS register shown at (i) has Y bits CSx (x=1, 2, . . . Y) indicating the current use status of the memory's character address area (f). Bit CSx indicates the use status of the corresponding character address area $C_x$.

Microprocessor 100 has access to both its internal s the use status of the corresponding character address area $C_x$.

Microprocessor 100 has access to both its internal scratchpad memory RAM 180 (FIG. 7) and the external RAM 300 shown in FIGS. 5 and 8. The main difference between these two RAM memories is that because scratchpad RAM 180 is on the microprocessor chip, it can be accessed faster than external RAM 300. Therefore, either of these memories could be used to provide the various message and display control memory areas shown in FIG. 12. However, for convenience of explanation, let us assume that the memory areas for the message table (a) and the three registers at (g), (h) and (i) are provided on scratchpad memory 180. The three registers are respectively the F-STATUS register, the S-STATUS register, and the C-STATUS register.

The message file area (b), sector area (c), control file area (d), control code area (e), and character address area (f) will be provided on external memory RAM 300. Earlier it was mentioned that RAM 300 acts as a first memory means for storing received message information. In the example memory configuration, RAM 180 and the "control data" storing portions of RAM 300 will together act as a second memory means for storing control data related to the display of the messages.

The decoded message portion signals $M_n$ contain the 2-bit display control codes of Classification Areas 1 and 2 and the 9-bit character position indicating numbers of the Control Area. As these arrive, microprocessor 100 refers to the C-STATUS register to learn which character address numbers $C_x$ are not yet being used. These available address numbers $C_x$ are then stored in the control files $F'_j$ of control file area (d) to indicate the addresses where the 9-bit character position indicating numbers are stored. As each $C_x$ is used, microprocessor 100 updates the C-STATUS register by putting a "1" in the appropriate bit CSx. The addresses $C_x$ used to store the 9-bit character position indicating numbers are located in external RAM 300.

The decoded message portion signals $M_n$ next contain the data of the message information areas. As these arrive, microprocessor 100 refers to the F-STATUS and S-STATUS registers to learn which message files $F_j$ and sectors $S_k$ are not yet being used. The available sector names are then stored in the available message files $F_j$ in the message file area (b) of external RAM 300 to indicate the sectors where a message will be stored. As each sector $S_k$ is used to store message information, microprocessor 100 updates the F-STATUS and S-STATUS registers by putting a "1" in the appropriate bits FSj and SSk.

Microprocessor 100 transmits the 20 or 21 bits of data in each of the error corrected message portion signals $M_n$ to external RAM 300, where the data is stored for safekeeping. Using FIGS. 6 and 8, how this is done will now be explained. First, microprocessor 100 outputs a logical "0" at port 113 as a chip enable signal CE to put external RAM 300 in its active mode. Next, microprocessor 100 refers to the F-STATUS, S-STATUS, and C-STATUS registers in its scratchpad RAM 180 to confirm the use condition of the various memory areas in external RAM 300.

The address information about unused memory areas is transmitted to RAM 300 by a signal SOUT via serial interface 108. To indicate that signal SOUT contains address information, microprocessor 100 outputs a logical "1" at port 114 to make an A/D (address/data) control signal to RAM 300 designate "address". It also sends clock timing pulses to RAM 300 as a system clock signal SCK via interface 108.

In accordance with the various control signals (CE, A/D, R/W) input to it, RAM 300 of FIG. 8 interprets signal SOUT as an address signal. The address counter 320 and X-Y decoder 330 in RAM 300 are then used to designate the array addresses in memory array 340 at which display data is written when received.

Next, microprocessor 100 readies RAM 300 to receive and store output signal SOUT as message and character position data, etc. It switches the A/D signal to "0" for "data" and the R/W signal to "0" for "write". Signal SOUT, transmitted via serial interface 108, now carries the message and character position data, etc. to be received and stored by RAM 300.

In response to the various control signals, RAM 300 writes the data received as signal SOUT in memory array 340 at the previously designated array addresses as message and character position data.

As successive message signals are decoded by the microprocessor, eventually a preselected pattern indicating the end of the message signals is detected among the decoded message data. When microprocessor 100 finds that it cannot receive the message signal for two successive words, it outputs an ME (message end) signal at output port 111 to inform address decoder 40 that the message has ended. Whereupon, decoder 40 stops supplying clock signal CL to microprocessor 100 at input port 105. Or alternatively, should decoder 40 be first in detecting an end or stop signal portion E in received signal h, it automatically stops supplying clock signal CL to microprocessor 100.

When it finds that the message has ended, microprocessor 100 stops the processing by which it decodes the message signals. At the same time, it outputs an audio control signal AC at output port 112 to control a sound generating circuit in decoder 40.

In response to control signal AC, as shown in FIG. 11, a sound generating signal k is applied to the base of NPN transistor 730 via input resistor 710. The collector output of transistor 730 is coupled to the base of PNP transistor 740 by resistor 720. As signal k drives transistor 730 between conduction and non-conduction, the base voltage of transistor 740 is correspondingly switched between two voltage levels corresponding to logical "0" and "1".

As a result, transistor 740 is switched between conduction and non-conduction, regulating the driving current supplied to speaker 80 by battery 1000 which is coupled to the emitter of transistor 740. This causes speaker 80 to produces an audible alarm, informing the user of the paging receiver that he has been paged.

Typically, this type of paging receiver has an automatic alarm cutoff function (auto-reset function) which terminates the paging alarm after a preset period, such as about 8 seconds. In the present embodiment, also, the pager's alarm automatically stops after a short timed interval.

The frequency regulating crystal 41 which is coupled to decoder 40 is part of a crystal oscillator circuit within the decoder. The oscillator circuit produces a high frequency signal which is frequency divided to produce a periodic signal $f_T$ of about 2 kHz. This is supplied to microprocessor 100 at input port 104 and used as a timing signal. The pager's alarm is terminated after a timed interval of about 8 seconds.

While the alarm is sounding, the user may choose to close operating switch SW0 (FIG. 2). This causes address decoder 40 to output a signal R to interrupt port 107 of microprocessor 100. Microprocessor 100 then immediately terminates the audio control signal AC which is being sent to decoder 40 at output port 112. This cuts off the pager's alarm without waiting for the end of the 8 second interval.

Suppose that a number of paging messages have been received and stored in the pager's memory as described above, and that the paging alarm has been terminated. Now the user can close switch SW0, generating a trigger signal. This causes decoder 40 to send an interrupt signal R to microprocessor 100 via interrupt port 107. Microprocessor 100 responds by switching the paging receiver into its Mode Selection state X1 of FIG. 14.

The user can then select the Summary Display mode X5 by closing switch SW1 (to pass to the Message Display Mode X2) and then closing switch SW3. Closing these switches produces further trigger signals, in accordance with which the microprocessor switches into the summary display function mode of the invention.

That is, when several individual messages are stored in RAM 300, successive closing of switches SW0, SW1, and SW3 puts the paging receiver in its Summary Display function mode. A summary display provided by the sender, such as a Partial display, a Key Word display, etc., is then shown of the stored messages, in order beginning with the most recently received.

Figures 13, 13A:
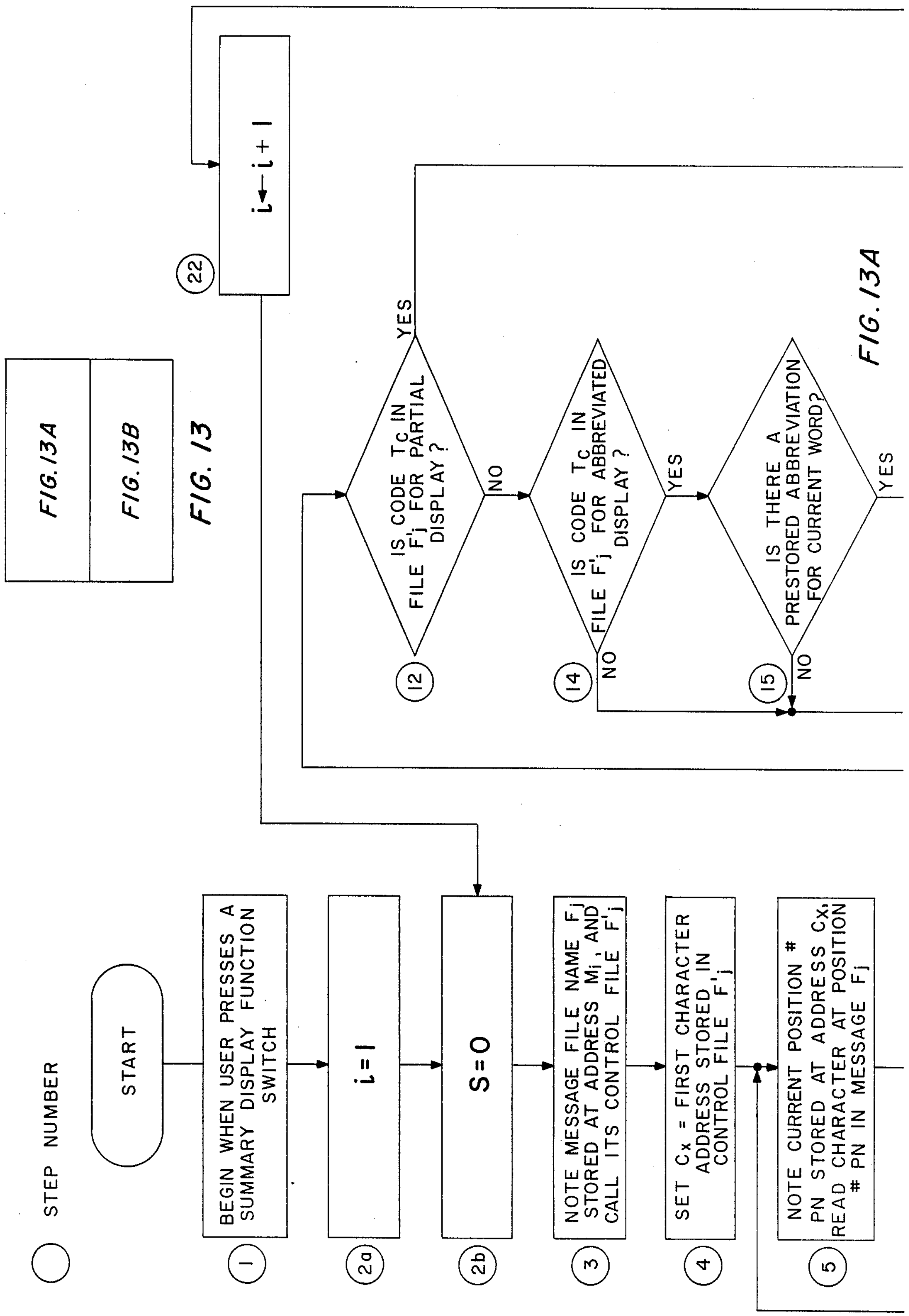
FIG. 13 is an assembly diagram of a sample flow chart consisting of FIGS. 13A and 13B showing how a summary display function can be provided by the receiver of FIG. 2.
Figure 13B:
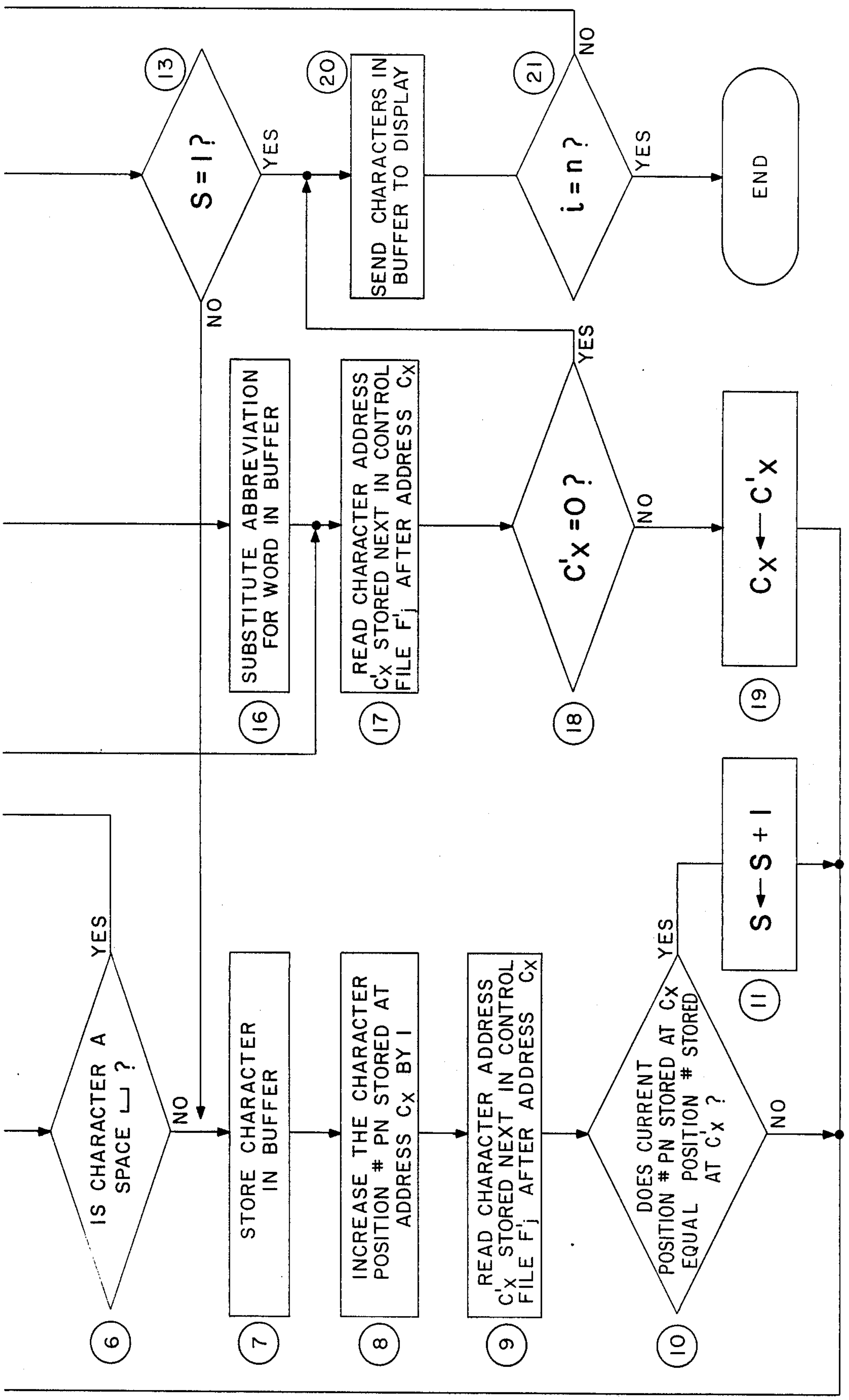

FIG. 13 shows a sample flow chart of how a summary display function can be provided by suitable programming of microprocessor 100.

The summary display function routine begins when the microprocessor is in the Message Display Mode X2 and the user closes operating switch SW3 (Step 1). Then, an index variable i is initially set equal to the number 1 (Step *2a*). This prepares microprocessor 100 to begin by processing the most recently received of the stored messages. Next a register S is initially set equal to zero (Step *2b*).

From the message table of (a) of FIG. 12 the microprocessor determines which file name $F_j$ is stored at address Mi. It then calls up the corresponding control file named $F'_j$, which has the same subscript j that appears in file name $F_j$ (Step 3).

Since Step 2 has set i=1, the microprocessor enters the message table of (a) of FIG. 12 at address M1. Address M1 always holds the file name $F_i$ of the most recently received of the stored messages. In the example of (a) of FIG. 12, address M1 holds the file name $F_1$, so corresponding control file $F'_1$ is called up.

The first character address stored in control file $F'_j$ of (d) of FIG. 12 is read as $C_x$ (Step 4). Then, the current character position number PN stored at character address $C_x$ is read. The microprocessor uses the position number PN to read out the character at that position in the message that is stored in RAM 300 (Step 5). This character is the first character in the first word of the summary display made from the message.

In the example of (d) of FIG. 12, in control file $F'_1$, the first character address is $C_1$. The character position table at (f) of FIG. 12 shows that the character position number stored at character address $C_1$ is a binary "000 101 001", equivalent to decimal 41. Therefore, the microprocessor will read out from RAM 300 the 41st character in the message of file $F_1$. As shown in FIG. 4(*c*), the 41st character in this message is the "G" of "GO".

In the Figures, the symbol "␣" is used to represent a blank character in the display. The microprocessor's ALU circuit 150 determines if the character which has just been read out is a blank (Step 6). If it is not, the character is loaded in a buffer register (Step 7).

Then, to indicate the next character for the summary display, the character position number PN found at character address $C_x$ is increased by one (Step 8). In the above example, the current character position is 41 for the letter "G". This is increased to position 42, which corresponds to the "O" of "GO".

If the summary display is a Partial Display, Steps 9, 10, and 11 will detect when the beginning of the last word of the Partial Display has been reached and set an indicating register S.

The next character address in the control file $F'_j$ of (d) of FIG. 12 is read as $C'_x$ (Step 9). For a Partial Display, the character position number stored at $C'_x$ is the position number PN of the first character in the last word of the Partial Display.

In the example of (d) of FIG. 12, control file $F'_1$ begins with code address $T_1$ for a Partial Display. The $C'_x$ character address is $C_3$. The character position number stored at character address $C_3$ is a binary "000 101 111", equivalent to decimal 47. Therefore, the 47th character in the message file $F_1$ is the first character of the last word of the Partial Display. (As shown in FIG. 4 (*c*), this character is the "N" of "NARITA".)

The current position number PN stored at character address $C_x$ is compared with the position number stored at character address $C'_x$ (Step 10). If they are equal, a register S in scratchpad RAM 180 which was initially at "0" is set to "1" for use later at Step 13 (Step 11). Otherwise, the microprocessor loops back to Step 5 to read out the next character in the message stored in RAM 300.

In the above example, the current character position number PN stored at character address $C_x$ was increased to 42 at Step 8. Since 42 does not equal the position number 47 stored at character address $C_3$, the microprocessor loops back to Step 5 to read out the letter "O" stored at character position number 42.

As previously mentioned, after each additional character for the summary display is read out at Step 5, it is checked to see if it is a blank (Step 6). A blank indicates the end of the current word the characters of which are being processed.

If a blank is detected at Step 5, the control code address $T_c$ in control file $F'_j$ is used to determine if the summary display is coded for a Partial Display (Step 12).

If the code is for a Partial Display, Register S is read to see if its contents are 1 (Step 13). A 1 in register S means that all the characters to be used in the Partial Display have been loaded into the buffer register. Therefore, the microprocessor now sends these characters to LCD Driver 200 to have them displayed by LCD display 90 (Step 20). However, a 0 in register S means that there are further words for the Partial Display not yet loaded. Therefore, there is a jump back to Step 7 to continue loading characters for the display into the buffer register.

If, at Step 12, a Partial Display is not called for, the control code address $T_c$ in control file $F'_j$ is used to determine if the summary display is coded for an Abbreviated Display (Step 14). If it is, PROM 50 is checked to see if the word just ended by the space detected at Step 6 has a prestored abbreviation message (Step 15). If it does, the abbreviation message is substituted for the word in the buffer register (Step 16). Otherwise, there is no substitution, and the microprocessor moves on to Step 17.

The microprocessor will also reach Step 17 if at Step 14 the control code address $T_c$ in control file $F'_j$ indicates that the summary display is coded for a Key Word Display. In either case, an Abbreviated or Key Word Display, the next character address in the control file $F'_j$ of (d) of FIG. 12 is read as $C'_X$ (Step 17). If character address $C'_X$ is 0, there are no more words for the Abbreviated or Key Word Display (Step 18).

This also means that all the characters to be used in the Abbreviated or Partial Display have been loaded into the buffer register. Therefore, the microprocessor now sends these characters to LCD Driver 200 to have them displayed by LCD display 90 as summary messages that fit within its limited display area.

Except that they come from the buffer register, the characters for the summary display are sent by the microprocessor for display by the display means in the same way that the full message data stored in external RAM 300 is sent and displayed.

Assuming that there are n messages to be displayed by summary display, a check is made to see if index variable i=n (Step 21). If it does not, index variable i is increased by 1 (Step 22) and a return is made to Step **2*b* to make a summary display of the next message. When all n messages have been displayed, i=n (Step 21**) and the summary display routine ends.

The flow chart of FIG. 13 illustrates a technique by which various summary displays, such as Partial Displays, Key Word Displays, and Abbreviated Displays can be provided.

However, should other types of summary displays be desired, they can be provided. For example, a "Message Type Display" indicating the message topic or class may be needed. Or it may be desired to select key words from a message but change their order of appearance for the Key Word Display, etc. The 00 code of Classification Area of FIG. 4(*a*) could be used to indicate such further displays, and the number of bits in Classification Area 2 expanded to provide the necessary additional codes.

In a selective paging receiver having the above described construction and operation, the received paging signals have control codes preceding the message information. The control codes enable only the principal items which tell the gist of the messages to be selected from the message contents. These appear in a summary display that fits within the limited display area of the display panel.

In practice, various summary displays, such as Partial Display, Key Word Display, Abbreviated Display, and Message Type Display, can be provided. Such summary displays enable the user to quickly grasp the gist of a number of relatively long received messages without having to repeatedly scroll the display to read through each message in its entirety.

Those who are skilled in the art will readily perceive how to modify the invention. Therefore, the appended claims are to be construed to cover all equivalent structures which fall within the true scope and spirit of the invention.

The invention claimed is:

1. A selective paging receiver with a message display means which is capable of receiving selective paging numbers and message data for displaying messages to the user, said receiver comprising:

first memory means for storing message data;

second memory means for storing control data relative to the display of messages which are sent and arrive together with the message data;

display controller means for controlling the contents of the messages to be displayed based on the control data to produce a summary of the messages; and display means responsive to control from the display controller for displaying said summary of the messages.

2. The selective paging receiver of claim 1 wherein said summary of the messages has at least one of the following forms: the partial form of the messages, the key word form of the messages, and the abbreviated form of the messages.

3. A paging receiver comprising memory means for storing a plurality of sample messages, means for receiving relatively long messages which are transmitted in the form of data composed of a bit stream, means responsive to certian bits at predetermined locations in said bit stream for identifying selected memory locations in said memory means where said sample messages are stored, and means responsive to said certain bits for reading out and displaying the sample messages at said identified locations to produce a shortened form of said long message displayed as a summary message in response to said bit stream.

4. The receiver of claim 3 and means for scrolling selected ones of said long messages which are associated with a summary message that is selected by a user of said paging receiver, whereby said user is not required to read many long messages which are of no interest to him.

5. The receiver of claim 4 wherein said summary messages are formatted in at least one of the following forms: the partial form of the message, the key word form of the messages, and the abbreviated form of the messages.

6. The receiver of claim 5 wherein there are a plurality of said summary message formats, means responsive to said certain bits for selecting one of said plurality of formats, and means for displaying said summary message in the selected format.

7. The receiver of claim 6 and means for giving the user a signal to indicate the presence of a message.

8. A process for conveying messages to a remote user of a paging receiver, said process comprising the steps of:

(a) prestoring a plurality of message fragments in a paging receiver;

(b) transmitting data in the form of a bit stream to said paging receiver;

(c) selecting certain bits in said bit stream and selecting some messages in said bit stream in response to said certain bits;

(d) seeking stored message fragments corresponding to the selected some messages;

(e) combining said message fragments which correspond to the selected some messages and with the remaining messages which do not correspond to any one of said message fragments to produce a summary of an entire message in said bit stream; and (f) displaying said summary of the entire message.

9. The process of claim 8 and the added step of signaling said user that said summary of the entire message is being displayed.

10. The process of claim 9 and the added step of enabling said user to view a display of said entire message which is selected by said user, whereby a user may eliminate the need to read any of the entire messages except for said summaries of the entire messages.

11. A method of displaying a summary of messages at a paging receiver, said method comprising the steps of:

receiving a paging signal including said messages and control data preceding said messages;

storing the received messages;

storing the received control data;

controlling the contents of said messages based on said control data to produce said summary of said messages; and displaying said summary of said messages.

12. A method of displaying a shortened form of a relatively long message as a summary message, said method comprising the steps of:

receiving said long messages which are transmitted to a paging receiver in the form of data composed of a bit stream;

seeking certain bits at predetermined locations in said bit stream;

storing said long messages and said certain bits;

responsive to said certain bits, identifying selected messages in said long messages to produce said summary message; and displaying said summary message on a display unit of said receiver.

* * * * *